United States Patent
Wang et al.

(10) Patent No.: US 11,168,424 B2
(45) Date of Patent: Nov. 9, 2021

(54) WATERLESS DYEING DEVICE AND METHOD FOR BOBBIN YARN, AND PRODUCT

(71) Applicant: QINGDAO JIFA GROUP CO., LTD., Qingdao (CN)

(72) Inventors: Jian Wang, Qingdao (CN); Weidong Yang, Qingdao (CN); Gang Wan, Qingdao (CN); Chongbo Liu, Qingdao (CN); Shaobing Liu, Qingdao (CN); Dapeng Lin, Qingdao (CN)

(73) Assignee: QINGDAO JIFA GROUP CO., LTD., Qingdao (CN)

( * ) Notice: Subject to any disclaimer, the term of this patent is extended or adjusted under 35 U.S.C. 154(b) by 123 days.

(21) Appl. No.: 16/464,185

(22) PCT Filed: Dec. 29, 2016

(86) PCT No.: PCT/CN2016/113171
§ 371 (c)(1),
(2) Date: May 24, 2019

(87) PCT Pub. No.: WO2018/098885
PCT Pub. Date: Jun. 7, 2018

(65) Prior Publication Data
US 2020/0378046 A1    Dec. 3, 2020

(30) Foreign Application Priority Data

Dec. 2, 2016 (CN) .......................... 201611094511.X

(51) Int. Cl.
| D06B 23/14 | (2006.01) |
| D06B 5/16 | (2006.01) |
| D06B 23/04 | (2006.01) |
| D06B 23/22 | (2006.01) |
| D06P 1/94 | (2006.01) |
| D06P 3/54 | (2006.01) |
| D06B 23/20 | (2006.01) |

(52) U.S. Cl.
CPC .............. *D06B 23/14* (2013.01); *D06B 5/16* (2013.01); *D06B 23/04* (2013.01); *D06B 23/205* (2013.01); *D06B 23/22* (2013.01); *D06P 1/94* (2013.01); *D06P 3/54* (2013.01); *D06B 2700/36* (2013.01); *D10B 2331/04* (2013.01); *D10B 2501/00* (2013.01)

(58) Field of Classification Search
CPC ...... D06B 23/14; D06B 23/04; D06B 23/205; D06B 23/22; D06B 5/16; D06B 2700/36; D06P 1/94; D06P 3/54; D10B 2331/04; D10B 2501/00
See application file for complete search history.

(56) References Cited

U.S. PATENT DOCUMENTS

| 5,972,045 | A | * | 10/1999 | Eggers | .................... | D06B 23/20 |
| | | | | | | 8/475 |
| 6,048,369 | A | * | 4/2000 | Smith | .................... | D06B 23/20 |
| | | | | | | 8/475 |
| 2006/0179810 | A1 | * | 8/2006 | Liao | ......................... | D02G 3/36 |
| | | | | | | 57/200 |

FOREIGN PATENT DOCUMENTS

| CN | 1200153 | 11/1998 |
| CN | 1632218 | 6/2005 |
| CN | 1693580 | 11/2005 |
| CN | 1807742 | 7/2006 |
| CN | 101555665 | 10/2009 |
| CN | 102787459 | 11/2012 |
| WO | WO2004040057 | 5/2004 |

\* cited by examiner

*Primary Examiner* — Amina S Khan
(74) *Attorney, Agent, or Firm* — Jiwen Chen; Jacobson Holman PLLC

(57) ABSTRACT

A waterless dyeing device for cone yarn, a waterless dyeing method and a produce are provided; wherein the device comprising: a dye autoclave (1); a dyeing autoclave (2); a recycle autoclave (6); a dyeing circulation system in which the dye autoclave (1), the dyeing autoclave (2) and the recycle autoclave (6) are in fluid communication with; wherein further comprises: a cone yarn inlet formed on the top of the dyeing autoclave (2), which is provided with a sealing cap (7); a cone yarn center shaft (10) vertically disposed at the center inside the dyeing autoclave, which is a perforated outlet tube with fluid discharge holes opened on the side wall; an intake pipe (13) disposed on the bottom of the dying autoclave (2) which is in communication with the cone yarn center shaft (10); a dyeing autoclave outlet (9) disposed on the dying autoclave (2); and a CO2 container (4), a pressure pump, a circulation pump (3) and conduits which are included in the dyeing circulation system. The dyes are disposed in the dye autoclave (1) and the cone yarns are disposed inside the dyeing autoclave (2), CO2 is introduced into the dye autoclave (1) to dissolve the dyes gradually, and the CO2 carrying the dyes to the dyeing autoclave (2) to dye and diffuse. The present invention has the advantages of being high in production efficiency, even in dyeing effect and high in safety, and is suitable for waterless dyeing of polyester cone yarns.

1 Claim, 2 Drawing Sheets

WATERLESS DYEING DEVICE AND METHOD FOR BOBBIN YARN, AND PRODUCT

This is a U.S. national stage application of PCT Application No. PCT/CN2016/113171 under 35 U.S.C. 371, filed Dec. 29, 2016 in Chinese, claiming priority of Chinese Application No. 201611094511.X, filed Dec. 2, 2016, which is hereby incorporated by reference.

FIELD OF THE INVENTION

The invention belongs to the technical field of dyeing and relates to the water-free supercritical $CO_2$ dyeing technology, and particularly is directed to a device for the dyeing of textile materials, such as cone yarn, and further relates to a dyeing method and a product.

DESCRIPTION OF THE RELATED ART

Water scarcity is a severe issue in China where the water resources are grown deteriorating and wasted. The textile industry is believed to be one of the biggest consumers of water. In conventional textile dyeing, large amounts of water are used as medium both in terms of intakes of fresh water and disposal of a large number of sewage with chemicals, such as dyes and surfactants, which are harmful to the environment. The waste water discharged requires neutralization and sedimentation that processes demands huge manpower and resources. According to a copy of incomplete statistics data, the overall textile printing and dyeing industry consumes 1.7 billion tons of water annually and produces 1.6 billion tons of effluent. In most regions of China, the shortage of water, especially the discharge of sewage, is the key factor imposing restrictions on the development of dyeing industry. Hence, research on green and effective dyeing technology becomes a primary goal for the industry, which is aimed at preventing the environment from being further polluted.

In recent years, an innovative green dyeing technology—supercritical $CO_2$ waterless dyeing has created a positive outlook for the industry. People from around the world have shown interest in this new process due to its characteristics of being high efficiency, no pollutants produced and shorter in dyeing time. In the process, carbon dioxide turns to a supercritical state, neither a complete gas state nor a liquid state, at a pressure higher than 73.8 bar and a temperature higher than 31.1° C. and, being powered by pump, circulates continuously between dye caldron and dyeing caldron. As a carrier, carbon dioxide transfers the dissolved dye to pores on fibers during which the dyeing of fabric is being evenly and rapidly effectuated. The entire process does not need any cleaning or drying procedures. People from many countries tend to develop the environmental friendly technology which contributing to reducing the consumption of energy and hope to enable it to be industrialized.

However, as a brand-new technology in dyeing industry, various problems inevitably occurs in production and the known dyeing process is not suitable to dye textile in the industrial scale.

The CN101148813A describes the generation principle which is to be taken into account when fabric is to be dyed in supercritical $CO_2$. However, this publication does not disclose details of the dyeing process. The CN101812809A (Zheng Laijiu et al.) proposed a method for dyeing short fibers by using supercritical $CO_2$ waterless dyeing technology and it refers to the fact that merely a few types of dyes could be used, but it is however not suitable to dye polyester with a huge consumption amount up to 38 million tons per year. Another Chinese patent CN1807742A discloses a dyeing apparatus with a two-way circulation of dye fluid, by means of which the dyeing could be carried out evenly; however in the course of its operation, the circulation direction of the dyeing fluid has to be switched, which places strict sealing and safety requirements for most key components of the ultra-high-pressure water-free dyeing apparatus, such as for the open and close control; but in fact most of valve made domestically could not meet the requirements of service life. The CN101024922A provides an integrated dyeing autoclave and a system, and it uses a vertical axis dyeing model and multiple parallel sets of dyeing autoclaves to achieve process production and improve production efficiency. In general, the aforementioned merely relates to small-sized or medium-sized apparatus and its production process is comparatively under developing. It is also not found any mature dyeing technology especially for the dyeing of polyester cone yarn. The dyeing of polyester cone yarn or specifically refers to the dyeing of polyester yarn wound on a mental or plastic tube, and during the dyeing operation, the dye needs to be powered by a circulation pump to saturate the yarn from the outer to the inner side. However, as the bobbin is vertically disposed, it stays motionlessly so the dye fluid only driven by the circulation pump may be easily affected by features as the path of mass transfer, and further cause a decrease in dyeing levelness. Moreover, the yarns wound on bobbin have a comparatively high density so that it poses high requirements on designing the circulation pump, as well as other key elements of the dyeing system.

Technical Problem

Considering the prior art, how to design a waterless dyeing device and method for cone yarn with high production efficiency, even dyeing effect and high reliability, especially a supercritical $CO_2$ waterless dyeing of polyester cone yarn suitable for industrialization is an urgent technical problem to be solved.

SUMMARY OF THE INVENTION

It is an object of the present invention to provide a waterless dyeing device and method for cone yarn with high production efficiency, even dyeing effect and high reliability, and especially suitable for industrialization.

The object of the invention is achieved by the following technical solutions:

A waterless dyeing device for cone yarn comprising: a dye autoclave; a dyeing autoclave; a recycle autoclave; a dyeing circulation system in which the dye autoclave, the dyeing autoclave and the recycle autoclave are in fluid communication with; wherein further comprises: a cone yarn inlet formed on the top of the dyeing autoclave, which is provided with a sealing cap; a cone yarn center shaft vertically disposed at the center inside the dyeing autoclave, which is a perforated outlet tube with fluid discharge holes opened on the side wall; an intake pipe disposed on the bottom of the dying autoclave which is in communication with the cone yarn center shaft; a dyeing autoclave outlet disposed on the dying autoclave; and a $CO_2$ container, a pressure pump, a circulation pump and conduits which are included in the dyeing circulation system.

Further, the dye autoclave includes three or more dye containers disposed in parallel, and an intake disposed on the bottom of each of the dye containers has a valve configured to control fluid amount; the $CO_2$ container is respectively connected to each of the valves on the intakes of the dye containers through conduits and an outlet of each of the dye containers are in communication with the intake pipe of the dyeing autoclave through conduits; the dyeing autoclave outlet is in communication with a circulation pump through conduits, and the circulation pump is respectively connected to each of the valves on the intakes of each of the dye containers; a branch joint of the dyeing autoclave outlet is connected to the recycle autoclave through conduits and over a pressure release valve, the recycle autoclave is connected to a condenser through conduits, the condenser is in communication with the $CO_2$ container, and the $CO_2$ container is connected to the pressure pump; each of the dye containers is provided with a heating jacket and electrical heating wires are wound on the conduits connected to the dye containers.

Further the dyeing autoclave is a cylindrical autoclave vertically placed, and a self-sealing coil is disposed on the sealing cap; a sealing ring underneath cone yarn surrounding the cone yarn center shaft is disposed on the bottom surface inside the dyeing autoclave, the dyeing autoclave outlet is disposed on the upper portion of the side wall of the dyeing autoclave.

Further the recycle autoclave is an elongated cylindrical autoclave, and within which a three-dimensional duplex strainer is arranged.

A waterless dyeing method using the waterless dyeing device for cone yarn, including pretreatment and dyeing, wherein the dyeing comprises:

Step 1: selecting dyes or a dye combination; drying and grounding the selected dye or dyes which were purified; weighing required dyes and respectively arranging the dyes within a corresponding dye containers; adjusting the opening amount of each of the valve on the intake of the dye containers according to the solubility of the dyes in supercritical $CO_2$ fluid; arranging cone yarns after pretreatment within the dyeing autoclave and mounting the cone yarns on the cone yarn center shaft;

Step 2: activating the pressure pump and guiding $CO_2$ into the dye containers; starting the heating jackets and the electrical heating wires and keeping them working until the temperature and pressure inside the dye containers reaching to set values, starting the circulation pump; at this point, the dyes begin to dissolve and flow with $CO_2$ fluid to the dyeing autoclave for dyeing and diffusing, which is going to last for a period of time;

Step 3: carrying out a recycle and separation process: opening the pressure release valve and introducing the fluid into a separating autoclave for separation; the separated $CO_2$ is guided to enter into the condenser within which $CO_2$ turns into liquid and being recovered in the $CO_2$ container;

Step 4: opening the dyeing autoclave and taking out the cone yarns after dyeing.

in the Step 1, the dyes are preferably disperse dye press cakes; firstly dissolving the disperse dyes in organic solvents, and then filtering, drying, and grounding to obtain required high solubility disperse dyes with a purification degree higher than 99.7%; the D50 dye is selected with a granularity of 0.05 mm, the cone yarn is polyester cone yarn, such as polyester filament or polyester staple yarn; in the Step 2, the set value of pressure in the dye containers lays between 8 MPa to 30 MPa and the set value of temperature in the dye containers lays between 60° C. to 120° C.; the circulation dyeing time on the cone yarns at the dyeing pressure and temperature is 50 minutes to 360 minutes; the supercritical fluid containing dyes is in full contact with the dyes loaded within the dye autoclave in circulating, and then effect the dyeing of cone yarns in the dyeing autoclave, so as to realize a diffusion-absorption-desorption dyeing process; in the Step 3, dyeing the fluid firstly flows through the separation autoclave to release pressure, and then starts the process of gas-solid separation; as the pressure is being released, the supercritical $CO_2$ turns into gaseous $CO_2$ and accompanying impurities are precipitated; the gaseous $CO_2$ passes through a 3D dimensional duplex filter and stored in the $CO_2$ container for the next cycle.

Further, the diameter-height ratio of the polyester cone yarn is in the range from 0.5:1 to 1.4:1.

Further, the cone yarn is polyester filament yarn or polyester staple yarn.

Further, the textile is knitted fabrics, woven fabrics, underwear or outerwear.

Effects of the Invention

Compared with the prior art, the invention has the following advantages and positive effects:

1. In the present invention, the dyes are dissolved in supercritical $CO_2$ which has a better penetrability for gas and a better solubility for liquid, and therefore compared with water dyeing, the medium is much more easily to enter into the inside of yarns so that the dyes being carried out could easily dye.

2. In the present invention, the disperse dye press cake is selected as the dyes over other commercial dyes which include a large amount of auxiliary materials, thereby improving the solubility of the dyes and dyeing efficiency.

3. In the present invention, the disperse dye press cake is being further purified: in the process of production of the disperse dye press cake, it is inevitably to introduce into by-products or residual production materials, according to the present invention, dissolving the dyes in organic solvents and then filtering could obtain dyes with high solubility.

4. In the present invention, the diameter-height ratio of the polyester cone yarn is properly adjusted to dye the cone yarn evenly.

5. In the present invention, multiple dye soluble channels are utilized so that multiple dyes could be dissolved independently so as to reduce the flaw of unlevel dyeing.

6. In the present invention, a method is provided in which the inner and outer fluids are alternately circulated; namely according to process parameters requirements, the $CO_2$ fluid in which the dyes carried out continuously passes through the core yarns from directions alternately changed, so as to ensure a level dyeing effect without dyeing defects.

7. In the present invention, a multi-stage duplex filter is arranged in the recycle autoclave for realizing a thorough gas-solid separation, and pure $CO_2$ could be prepared and stored for the next cycle without affecting the subsequent dyeing process.

8. Additionally, no water is used in the dyeing process disclosed by the present invention and 90% $CO_2$ could be recycled, so that there will be no pollutants produced from the beginning; the dyeing process is environmentally friendly and clean, which would be a real breakthrough in textile dyeing industry.

Figure 1:
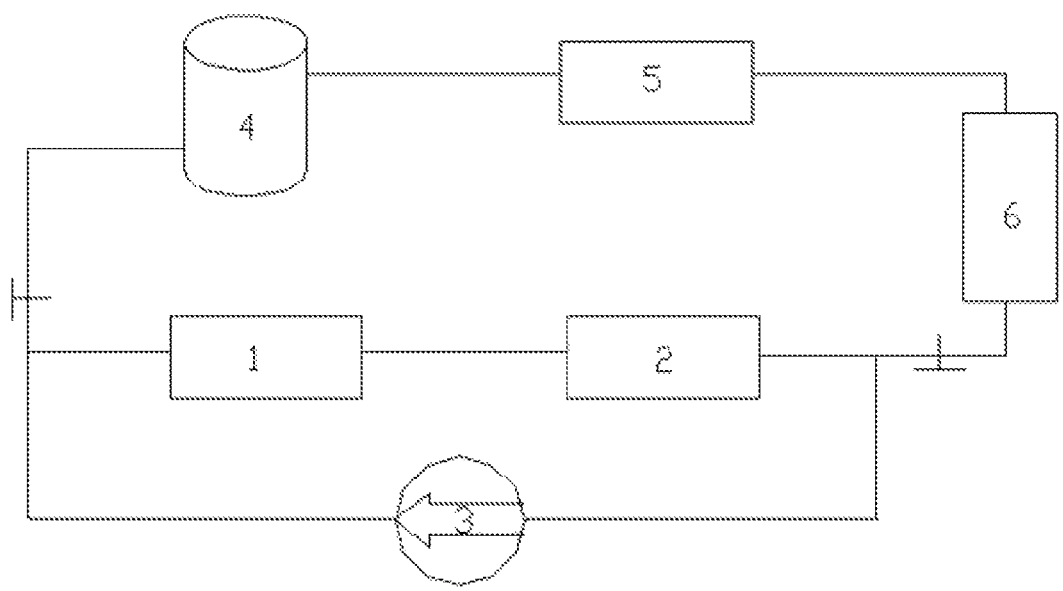
FIG. 1 shows a flow chart of a waterless dyeing device for cone yarn according to an embodiment of the present invention.
Figure 2:
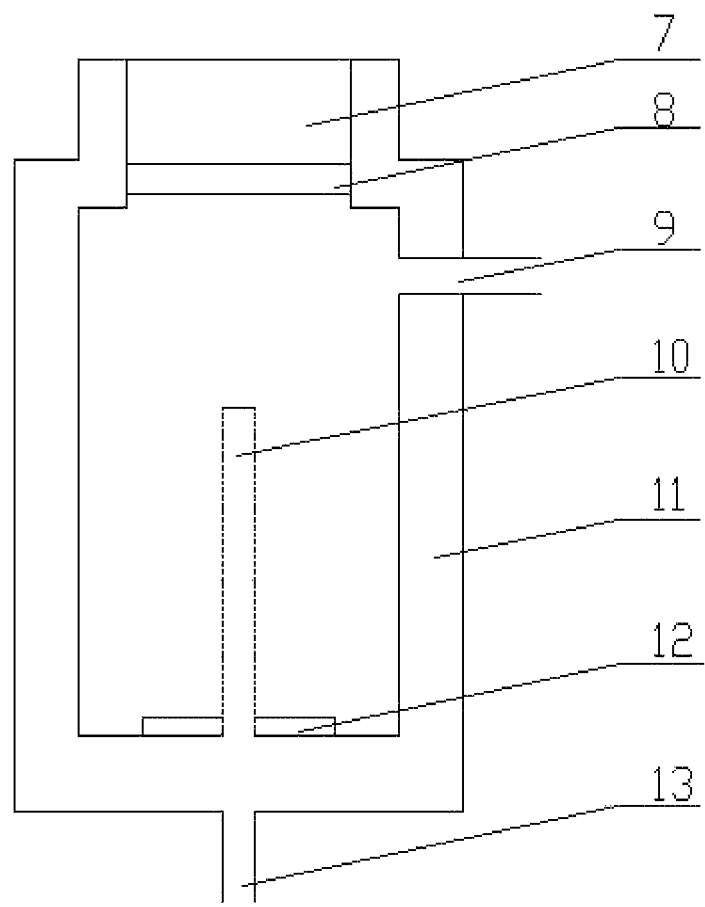
FIG. 2 is a schematic view of a dyeing autoclave of a waterless dyeing device for cone yarn according to an embodiment of the present invention.

Wherein in FIG. 1 and FIG. 2, 1—dye autoclave; 2—dyeing autoclave; 3—circulation pump; 4—$CO_2$ container; 5—condenser; 6—recycle autoclave; 7—sealing cap; 8—self-sealing coil; 9—dyeing autoclave outlet; 10—cone yarn center shaft; 11—side wall of dying autoclave; 12—sealing ring underneath cone yarn; 13—intake pipe.

DETAILED DESCRIPTION OF THE EMBODIMENTS

Hereinafter, embodiments of the present disclosure will be described in detail with reference to the accompanying drawings FIG. 1 and FIG. 2. A waterless dyeing device for cone yarn comprises a dye autoclave 1, a dying autoclave 2 and a recycle autoclave 6, further includes a dyeing circulation system in which the dye autoclave 1, the dyeing autoclave 2 and the recycle autoclave 6 are in fluid communication with. The dyeing autoclave 1 includes a cone yarn inlet on the top which is provided with a sealing cap 7. A cone yarn center shaft 10 is vertically disposed at the center inside the dyeing autoclave 2, and the cone yarn center shaft 10 is a perforated outlet tube with fluid discharge holes opened on the side wall. An intake pipe 13 is disposed on the bottom of the dying autoclave 2, which is in communication with the cone yarn center shaft 10 (the outlet tube). A dyeing autoclave outlet 9 is disposed on the dying autoclave 2. The dyeing circulation system further comprises a $CO_2$ container 4, a pressure pump, a circulation pump 3 and conduits.

Specifically, the dye autoclave 2 includes three dye containers in parallel, an intake disposed on the bottom of each of the three dye containers is provided a valve configured to control fluid amount. The $CO_2$ container 4 is respectively connected to each of the valves on the intakes of each of the three dye containers through conduits, and an outlet of each of the three dye containers is in communication with the intake pipe 13 of the dyeing autoclave 2 through conduits. The dyeing autoclave outlet 9 is in communication with a circulation pump 3 through conduits, and the circulation pump 3 is respectively connected to each of the valves on the intakes of each of the three dye containers; a branch joint of the dyeing autoclave outlet 9 is connected to the recycle autoclave 6 through conduits and over a pressure release valve, the recycle autoclave 6 is connected to a condenser 5 through conduits, the condenser 5 is in communication with the $CO_2$ container 4, and the $CO_2$ container 4 is connected to the pressure pump. Each of the three dye containers is enveloped with a heating jacket and those conduits connected to the dye containers are being wound on by electrical heating wires.

The dyeing autoclave 2 is a cylindrical autoclave vertically placed, and a self-sealing coil 8 is disposed on the sealing cap 7. A sealing ring underneath cone yarn 12 surrounding the cone yarn center shaft 10 (the outlet tube) is disposed on the bottom surface inside the dyeing autoclave 2. The dyeing autoclave outlet 9 is disposed on the upper portion of the side wall 11 of the dyeing autoclave 2.

The recycle autoclave 6 is an elongated cylindrical autoclave, and within which a three-dimensional duplex filter is arranged.

Referring to FIG. 1 and FIG. 2, a waterless dyeing method using the aforementioned waterless dyeing device is provided, which includes pretreatment and dyeing. To be specific, the dyeing comprises the following steps:

Step 1: selecting a dye or a dye combination; drying and grounding the selected dyes which were purified; weighing required dyes and put them in corresponding dye containers respectively; adjusting the opening amount of each of the valves on the intake of the dye container according to the solubility of the dyes in supercritical $CO_2$ fluid; arranging the cone yarns after pretreatment within the dyeing autoclave and mounting the cone yarn on the cone yarn center shaft.

Step 2: activating the pressure pump and guiding $CO_2$ into the dye containers; starting the heating jackets and the electrical heating wires and keeping them working until the temperature and pressure inside the dye containers reaching to set values, starting the circulation pump; at this point, the dyes begin to dissolve and flow with $CO_2$ fluid to the dyeing autoclave for dyeing and diffusing, which is going to last for a period of time.

Step 3: carrying out a recycle and separation process: opening the pressure release valve and introducing the fluid into a separating autoclave for separation; the separated $CO_2$ is guided to enter into the condenser within which $CO_2$ turns into liquid and being recovered in the $CO_2$ container.

Step 4: opening the dyeing autoclave and taking out the cone yarns after dyeing.

Specifically, in the Step 1, the dyes are preferably disperse dye press cakes; firstly dissolving the disperse dye in organic solvents, and then filtering, drying, and grounding to obtain required high solubility disperse dyes with a purification degree higher than 99.7%; the D50 dye is preferably selected with a granularity of 0.05 mm, the cone yarn is polyester cone yarn, such as polyester filament or polyester staple yarn.

In the Step 2, the set value of pressure in the dye containers lays between 8 MPa to 30 MPa and the set value of temperature in the dye containers lays between 60° C. to 120° C. The circulation dyeing time on the cone yarns at the dyeing pressure and temperature is 50 minutes to 360 minutes. The supercritical fluid containing dyes is in full contact with the dyes loaded within the dye autoclave in circulating at first and then effect the dyeing of cone yarns in the dyeing autoclave, so as to realize a diffusion-absorption-desorption dyeing process.

In the Step 3, after dyeing the fluid firstly flows through the separation autoclave to release pressure, and then starts the process of gas-solid separation. As the pressure is being released, the supercritical $CO_2$ turns into gaseous $CO_2$ and accompanying impurities are precipitated. The gaseous $CO_2$ passes through a 3D dimensional duplex filter and stored in the $CO_2$ container for the next cycle.

Preferably, the diameter-height ratio of the above-mentioned polyester cone yarn is in the range from 0.5:1 to 1.4:1.

Further, a cone yarn which is produced by the aforementioned waterless dyeing method is provided, wherein the cone yarn could be polyester filament yarn or polyester staple yarn.

Further, a textile which is produced by the above-mentioned polyester filament yarn is provided, wherein the textile includes textile fabrics, garment products, shoes, caps, accessories and the like.

The textile fabrics include pure polyester knitted fabrics, pure polyester woven fabrics, fabrics interwoven with other yarns or composite fabrics.

Garment products comprise knitted underwear, shirts, sportswear, uniforms, skirts, jackets, suits, and the like.

Accessories include tie, scarf and the like.

The test results of various performance indicators of the product produced by the method or device disclosed by the present invention:

First of all, GB/T.3921.1-1997 Textiles—Tests for color fastness—Color fastness to washing: Test 1; GB7565-87 Textiles—Tests for color fastness—Specification for STANDARD adjacent fabric—Cotton and viscose and GB/T 6151-1997 Textiles-Tests for color fastness—General principle of testing are used to evaluate the color fastness of the textile fabrics produced on the basis of the disclosure by the present invention. The result shows that the color fastness to rubbing or washing of the textile fabrics dyed by the present invention are satisfied with the requirements of GB18401-2003 National general safety technical code for textile products, and the abrasion color fastness can reach to 3 to 4 grades, the color fastness to washing can reach to 4 to 5 grades.

Secondly, GB/T 3979-1997 Methods for the measurement of object color is used to evaluate the color difference of the textile fabrics produced on the basis of the disclosure by the present invention: observing the color difference A£ at three different positions which respectively distributed on the inside surface, in the middle part or on the outside surface of the textile fabrics in weaving by the cone yarn. The result shows that the measured color difference A£ is in a range from 0.5 to 0.7 between the three positions, which lower than any color difference grade. The above test results prove that: the products produced on the basis of the disclosure of the present invention could fully meet the requirements of relevant national quality standards, and suitable for the mass production of polyester cone yarn.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A waterless dyeing device for cone yarn comprising:
a dye autoclave;
a dyeing autoclave;
a recycle autoclave;
a dyeing circulation system that is in fluid communication with the dye autoclave, the dyeing autoclave and the recycle autoclave;
a cone yarn inlet formed on the top of the dyeing autoclave, which is provided with a sealing cap;
a cone yarn center shaft vertically disposed at the center inside the dyeing autoclave, which is a perforated outlet tube with fluid discharge holes opened on the side wall;
an intake pipe disposed on the bottom of the dyeing autoclave which is in communication with the cone yarn center shaft;
a dyeing autoclave outlet disposed on the dyeing autoclave; and
a $CO_2$ container, a pressure pump, a circulation pump and conduits which are included in the dyeing circulation system;
wherein the dye autoclave includes three or more dye containers disposed in parallel, and an intake disposed on the bottom of each of the dye containers has a valve configured to control fluid amount; the $CO_2$ container is respectively connected to each of the valves on the intakes of the dye containers through conduits and an outlet of each of the dye containers are in communication with the intake pipe of the dyeing autoclave through conduits; the dyeing autoclave outlet is in communication with a circulation pump through conduits, and the circulation pump is respectively connected to each of the valves on the intakes of each of the dye containers; a branch joint of the dyeing autoclave outlet is connected to the recycle autoclave through conduits and over a pressure release valve, the recycle autoclave is connected to a condenser through conduits, the condenser is in communication with the $CO_2$ container, and the $CO_2$ container is connected to the pressure pump; each of the dye containers is provided with a heating jacket and electrical heating wires are wound on the conduits connected to the dye containers;
wherein the dyeing autoclave is a cylindrical autoclave vertically placed, and a self-sealing coil is disposed on the sealing cap; a sealing ring underneath cone yarn surrounding the cone yarn center shaft is disposed on the bottom surface inside the dyeing autoclave, the dyeing autoclave outlet is disposed on the upper portion of the side wall of the dyeing autoclave; and
wherein the recycle autoclave is an elongated cylindrical autoclave, and within which a three-dimensional duplex strainer is arranged.

* * * * *